April 21, 1936. J. W. FLYNN 2,038,032
SHOCK ABSORBER
Filed Oct. 16, 1933
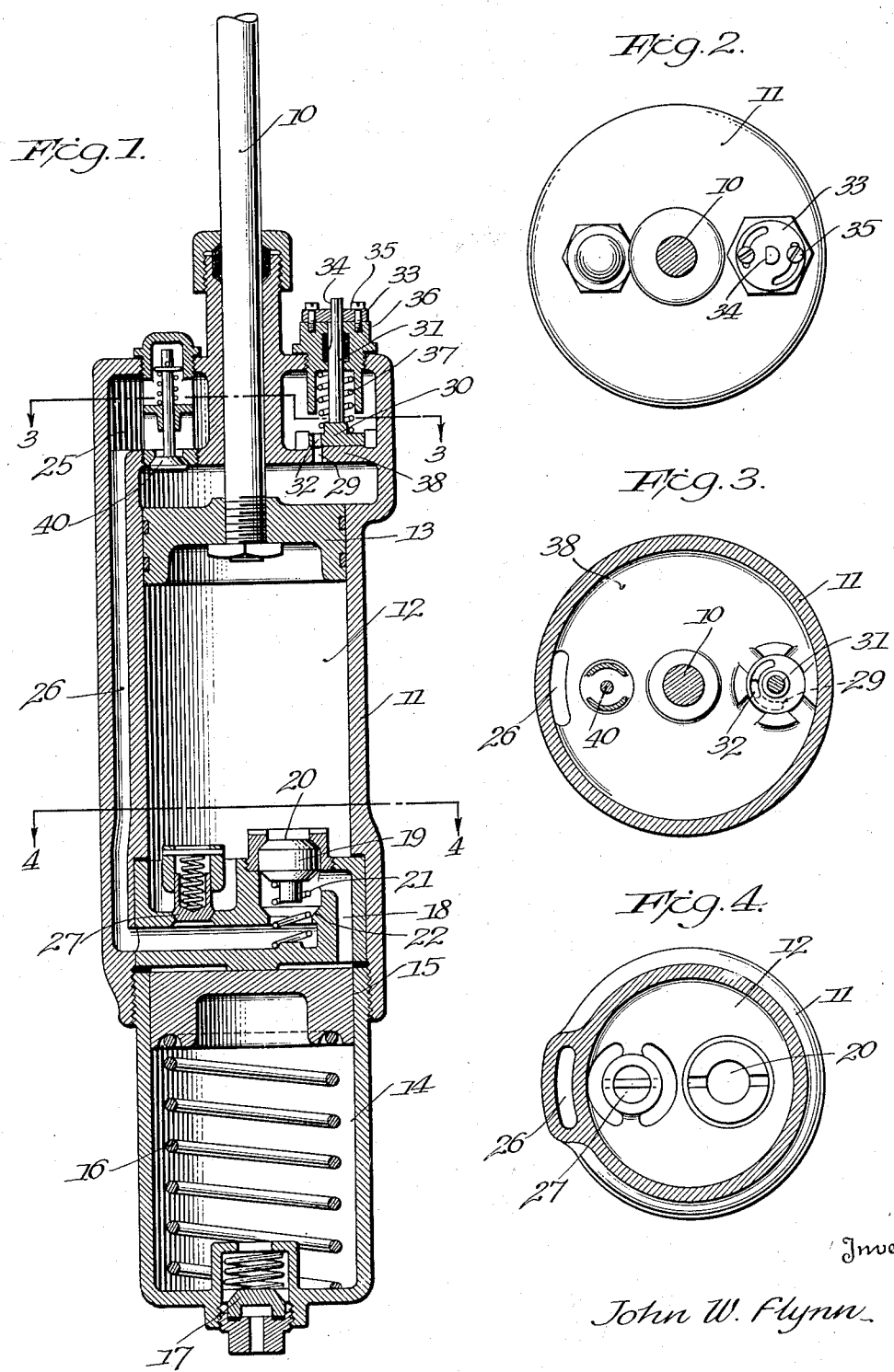
Inventor
John W. Flynn
By Cushman, Darby, & Cushman
Attorneys Patented Apr. 21, 1936

2,038,032

UNITED STATES PATENT OFFICE 2,038,032

SHOCK ABSORBER

John W. Flynn, Waterford, N. Y., assignor of two-fifths to Charles J. Ranney, Troy, N. Y.

Application October 16, 1933, Serial No. 693,853

7 Claims. (Cl. 267—34)

The present invention relates to shock absorbers.

The principal object of the invention is to provide a shock absorber which is so constructed that the movement of the relatively movable parts thereof will be efficiently cushioned throughout the entire range of such movement.

Shock absorbers of the type used upon automobiles or other vehicles ordinarily comprise a piston and cylinder operatively connected to relatively movable parts of the vehicle. The cylinder is usually filled with a substantially non-compressible fluid, such as oil or glycerine, which is caused to move through restricted ports in the device by reason of the relative movements of the piston and cylinder. A substantially non-compressible fluid will cushion the movements of the elements of the device under ordinary conditions, but if the movement is extremely sudden or severe, the fluid may not flow through the restricted ports with sufficient rapidity and, being non-compressible, will retard the movements of the relatively movable parts of the device to such an extent that they are, in effect, locked together, causing the body and running gear of the vehicle to move as one, instead of causing the movement of one to be cushioned with respect to the other.

The shock absorber of the present invention comprises a structure wherein the movement of the parts of the device in one direction is directly resisted by a substantially non-compressible fluid which, in turn, transmits the shock of a compressible fluid. Upon movement of the parts of the device in the opposite direction, such movement is initially resisted by reason of the fact that the non-compressible fluid flows through a restricted aperture. However, should the movement be too sudden or severe, the restricted aperture will open to permit the non-compressible fluid to flow more readily therethrough, thus enabling the parts of the device to continue to move with respect to each other in cushioning movement instead of being locked together.

While the shock absorber of the present invention is particularly designed for use upon vehicles, it will be understood that it is of general application.

Another object of the invention is to provide a shock absorber of the type described, which is sturdy and compact in construction and which may be economically manufactured.

Other objects and advantages of the invention will be apparent from the following specification and drawing, wherein:

Figure 1 is a central vertical sectional view through the shock absorber.

Figure 2 is a plan view.

Figure 3 is a horizontal sectional view taken on the line 3—3 of Figure 1, and

Figure 4 is a sectional view taken on the line 4—4 of Figure 1.

The numeral 10 designates a plunger member and the numeral 11 indicates a casing member. The plunger and casing are relatively movable with respect to each other and, in use upon an automobile, the plunger is ordinarily operatively connected to the body of the automobile or other vehicle, while the casing is operatively connected to the axle or running gear. It will be understood, however, that the manner of connection of these two elements to the relatively movable parts of the vehicle or other mechanism may be reversed, also, that these elements of the shock absorber may be operatively connected to the respective parts of the vehicle or mechanism in any suitable manner.

The casing 11 is provided with a cylinder 12 which may be termed the primary cylinder of the device and in which a piston head 13 included in the plunger member 10 is adapted to reciprocate. The cylinder 12 is filled with a substantially non-compressible fluid, such as oil or glycerine. The casing 11 also has operatvely associated therewith a secondary cylinder 14, which has a piston 15 movable therein. The piston 15 is ordinarily held near the upper or inner end of the secondary cylinder 14 by means of a coil spring 16. A check valve 17 is provided at the lower or outer end of the cylinder 14, which check valve is normally held closed by a spring, as shown. Beneath the piston 15, the cylinder 14 contains air under atmospheric pressure. Should the air in the cylinder 14 escape from any cause, the check valve 17 will open to permit air to flow into the cylinder 14, thereby maintaining atmospheric pressure in this cylinder.

The lower end of the primary cylinder 12 is suitably connected to the upper end of the secondary cylinder 14, as by means of a passage 18, which passage is normally held closed from the cylinder 12 by a valve 19 held seated upon a valve seat 20 by means of a spring 21. The valve 19 has seating surfaces upon both faces thereof and when it is forced downwardly against the action of the spring 21, by means of a high pressure within the primary cylinder 12 induced by downward movement of the plunger 10, the valve 19 will be seated upon a seat 22 beneath the mouth of passage 18, thereby opening this passage. It will be observed that the valve 19 is of the plunger type and is sufficiently long to prevent leakage about the valve during its movement past the inner end of the passage 18.

The casing 11 also includes a reservoir 25, preferably at the upper end of the primary cylinder 12, which reservoir is connected to the lower end of the cylinder 12 by means of a passageway 26, terminating in the port provided by the valve seat 22. A check valve 27 is provided at the lower or outer end of the primary cylinder 12 to permit fluid to be drawn into the cylinder upon movement of the plunger 10 away from this valve.

The upper wall of the primary cylinder 12 is provided with a restricted port 29, preferably of arcuate outline, through which fluid may escape from the primary cylinder 12 upon movement of the piston head 13 of plunger 10 toward this port. A valve 30 including a valve stem 31 is provided to regulate the flow through the port 29, the valve being provided with a preferably arcuate port 32. Valve 30 is ordinarily turned to partially align its port 32 with port 29, as shown in Figure 3, so that the flow through the latter port will be restricted by port 32. In order to permit adjustment of the port 32 of the valve 30 with respect to the port 29, a collar 33 is provided upon the upper end of the casing 11, which collar is keyed to the valve stem 31, as shown at 34. The collar 33 may be held locked in adjusted position with respect to the casing 11 by means of set screws 35 threaded in the valve fitting 36 and extending through arcuate slots in the collar 33.

A coil spring 37 is positioned between the inner surface of the valve fitting 36 and the upper surface of the valve 30 and, under normal pressures, holds the latter downwardly against the wall 38 between the reservoir 25 and the primary cylinder 12. However, should the piston head 13 of plunger 10 move upwardly too suddenly or with too great a pressure, the spring 37 will permit the valve 30 to open, thereby enabling fluid to flow from the primary cylinder 12 through the entire area of the port 29.

The keyed connection between the collar 33 and valve stem 31 will permit the valve to raise and to again descend without any change in the circumferential positioning of the valve with respect to the port 29.

A check valve 40 is also provided at the upper end of the primary cylinder 12 to permit inward flow of fluid from the reservoir 25 to the cylinder upon the downward movement of the plunger 10.

In the operation of the shock absorber of my invention, as applied to a vehicle, assuming that the plunger 10 is operatively connected to the body of the vehicle and that the casing 11 is operatively connected to the running gear or axle, a road shock will cause the plunger 10 and the casing 11 to move toward each other, with the result that the piston head 13 will move downwardly in the primary cylinder 12. The oil, glycerine or similar substantially non-compressible fluid within the cylinder 12 will exert pressure upon the valve 19 to move the latter downwardly to open the passageway 18 to the secondary cylinder 14.

The fluid flowing through the passageway 18 will act upon the upper surface of the piston 15 in the secondary cylinder 14, forcing the latter piston downwardly against the action of the spring 16 and the air or compressible fluid within the cylinder 14. The piston 15 will thereby cushion the movement of the plunger 10. It will be observed that means will be provided to always hold the upper face of the piston 15 spaced from the upper end of the cylinder 14, so that its entire upper surface will be exposed to the oil flowing from passage 18. During the movement of the plunger 10 described above, oil will be permitted to flow into the upper end of the primary cylinder 12 through the check valve 40.

Upon rebound movement of the parts of the shock absorber, the upward movement of the plunger 10 will cause the oil to be expelled from the upper end of the cylinder 12 through the port 29 in the cylinder wall 38 and thence through the port 32 in the valve 30. Should the rebound shock be severe, the greater pressure thereby exerted upon the portion of the valve 30 exposed at the port 29 will cause valve 30 to be lifted against the action of the spring 37, permitting oil to flow more rapidly from the cylinder 12 and thereby preventing the plunger 10 from being held relatively stationary with respect to the casing 11.

The check valve 40 will, of course, be held closed upon upward movement of the plunger 10, but the check valve 27 will open to permit oil to flow into the lower end of primary cylinder 12 from the passageway 26. The valve 19 will close immediately the plunger 10 begins to rise and the spring 16 in the secondary cylinder 14 will also raise the piston 15 to cause the oil to be expelled from the cylinder 14 through the passageway 18, past the valve seat 22 and into the passageway 26 connected to the reservoir.

It is to be understood that the invention is not limited to the details of construction shown in the drawing and described in the specification and that the example of the use of the device which has been given does not include all of the uses of which it is capable; also, that the phraseology employed in the specification is for the purpose of description and not of limitation.

I claim:

1. A shock absorber comprising a casing member, a plunger member, said members being adapted to be operatively connected to relatively movable elements, a primary cylinder in which said plunger member is movable, a secondary cylinder having a fluid cushioned piston therein, a reservoir, a valve to permit fluid flow from said primary cylinder to said secondary cylinder in one direction of movement of said plunger member and to permit flow from said secondary cylinder to said reservoir during movement of said plunger member in the opposite direction, said primary cylinder having a port at one end thereof to permit fluid flow to said reservoir during the last-mentioned movement of said plunger member.

2. A shock absorber comprising a casing member, a plunger member, said members being adapted to be operatively connected to relatively movable elements, a cylinder in said casing member in which said plunger member is movable, said cylinder containing a substantially non-compressible fluid, a second cylinder in said casing member, a piston in said last-named cylinder cushioned on one side by a compressible fluid, a connection between the portion of said second cylinder on the opposite side of said piston and said first-named cylinder to permit flow of said non-compressible fluid between said cylinders, a reservoir, and pressure responsive means to permit flow of fluid to said reservoir from the portion of said first-named cylinder distant from said connection.

3. A shock absorber comprising a casing member including a fluid containing cylinder, a reservoir, a plunger member movable within said cylinder of said casing member, said members being adapted to be operatively connected to relatively movable elements, a second cylinder, a piston in said second cylinder adapted to move in response to movements of said plunger member in one direction, said cylinders and said reservoir being connected by a port, a valve for said port adapted to alternately permit flow from said first cylinder to said second cylinder and from second cylinder to said reservoir but to maintain said first cylinder constantly closed from said reservoir, and means to permit flow from said first cylinder to said reservoir.

4. A shock absorber comprising a fluid containing casing member, a plunger member, said members being adapted to be operatively connected to relatively movable elements, a cylinder in said casing member in which said plunger member is movable, a reservoir communicating with said cylinder through a fluid port, a valve for controlling the flow of fluid through said port, a piston chamber associated with the casing member, a passage communicating the piston chamber with the cylinder and the reservoir, and valve means in said passage for selectively controlling communication of the piston chamber with the cylinder and the reservoir.

5. A shock absorber comprising a fluid containing casing member, a plunger member, said members being adapted to be operatively connected to relatively movable elements, a cylinder in said casing member in which said plunger member is movable, a reservoir arranged to communicate with the cylinder on one side of the plunger, a piston chamber arranged to communicate with the cylinder on the opposite side of the plunger, a passage communicating the piston chamber with the cylinder and the reservoir, and a single valve in said passage for selectively controlling communication of the piston chamber with the cylinder and the reservoir.

6. A shock absorber comprising a fluid containing cylinder member, a plunger member movable within said cylinder member, said members being adapted to be operatively connected to relatively movable elements, an auxiliary cylinder, a piston in said auxiliary cylinder adapted to be moved in response to movement of said plunger member, a reservoir arranged to communicate with the cylinder member and the auxiliary cylinder, a single valve for selectively controlling communication of the auxiliary cylinder with the cylinder member and the reservoir, and automatic valve means associated with the auxiliary cylinder to permit atmospheric pressure to flow to said auxiliary cylinder and prevent the formation of a vacuum therein.

7. A shock absorber comprising a liquid containing casing member, a plunger member movable within said casing member, and dividing the same into an upper and lower chamber, said members being adapted to be operatively connected to relatively movable elements, a piston in said casing member positioned below the plunger member and adapted to move in response to movement of said plunger member in one direction, means for establishing liquid communication between said chambers, and pressure responsive means located above the plunger member to permit a predetermined flow of fluid from the path of movement of said plunger member when the latter is moved away from the piston and adapted to permit a greater flow under abnormal conditions.

JOHN W. FLYNN.